US009394485B2

(12) United States Patent
Powell et al.

(10) Patent No.: US 9,394,485 B2
(45) Date of Patent: *Jul. 19, 2016

(54) PROCESS TO PRODUCE BIOFUELS FROM BIOMASS

(75) Inventors: Joseph Broun Powell, Houston, TX (US); Juben Nemchand Chheda, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,281

(22) Filed: Dec. 20, 2011

(65) Prior Publication Data

US 2012/0156742 A1   Jun. 21, 2012

Related U.S. Application Data

(60) Provisional application No. 61/424,816, filed on Dec. 20, 2010.

(51) Int. Cl.
 C10G 3/00   (2006.01)
 C10L 1/00   (2006.01)

(52) U.S. Cl.
 CPC .. *C10G 3/00* (2013.01); *C10G 3/42* (2013.01); *C10L 1/00* (2013.01); *C10G 2300/1014* (2013.01); *C10G 2300/202* (2013.01); *C10G 2300/4081* (2013.01); *Y02E 50/13* (2013.01); *Y02P 30/20* (2015.11); *Y02T 50/678* (2013.01)

(58) Field of Classification Search
None
See application file for complete search history.

(56) References Cited

U.S. PATENT DOCUMENTS

| | | | |
|---|---|---|---|
| 3,105,095 | A | 9/1963 | Oshima et al. ............... 260/593 |
| 6,100,385 | A | 8/2000 | Naae et al. |
| 6,372,121 | B1 | 4/2002 | McClain et al. |
| 7,960,520 | B2 | 6/2011 | McCall et al. |
| 9,000,245 | B2 | 4/2015 | O'Connor et al. |
| 2008/0216391 | A1 | 9/2008 | Cortright et al. ............... 44/307 |
| 2008/0312346 | A1 | 12/2008 | McCall et al. ............... 516/135 |
| 2009/0090046 | A1* | 4/2009 | O'Connor et al. ............. 44/307 |
| 2009/0126260 | A1 | 5/2009 | Aravanis et al. |
| 2010/0076233 | A1 | 3/2010 | Cortright et al. ............. 585/251 |
| 2010/0087689 | A1 | 4/2010 | Hinrichs et al. |
| 2012/0156743 | A1 | 6/2012 | Powell et al. ............... 435/155 |

FOREIGN PATENT DOCUMENTS

| | | |
|---|---|---|
| CN | 1416457 | 5/2003 |
| CN | 101460594 | 6/2009 |
| CN | 101641397 | 2/2010 |
| CN | 101711925 | 5/2010 |
| CN | 101805629 | 8/2010 |
| CN | 101855320 | 10/2010 |
| TW | 200916568 | 6/1997 |
| WO | 2008073186 | 6/2008 |
| WO | WO2010025241 | 3/2010 ............... C07C 2/54 |

OTHER PUBLICATIONS

Holladay JD et al. An overview of hydrogen production technologies. 2009. Catalysis Today. 139:244-260.*
Ordonez, C. et al; "Amino Acid Production from a Sunflower Wholemeal Protein Concentrate", Biosource Technology, vol. 99, Nov. 2007, pp. 4749-4754.
Scott, E. et al; "Biomass in the Manufacture of Industrial Products—The Use of Proteins and Amino Acids", Appl Microbiol Biotechnol, vol. 75, Mar. 2007, pp. 751-762.
Li, Ning et al, "Renewable Gasoline from Aqueous Phase Hydrodeoxgenation of Aqueous Sugar Solutions Prepared by Hydrolysis of Maple Wood", Green Chemistry, vol. 13, Nov. 2011, pp. 91-101.
The PCT 'International Search Report' dated Jul. 25, 2012 for application PCT/US2011/066140 filed Dec. 20, 2011.
Smook, Gary A., Handbook for Pulp & Paper Technologists, 2002, pp. 75-99.
Murata, Kazuhisa et al, "Hydrocracking of Biomass-Derived Materials into Alkanes in the Presence of Platinum-Based Catalyst and Hydrogen", Catal Lett, vol. 140, Aug. 2010, pp. 8-13.
Serrano-Ruiz, Juan Carlos et al, "Conversion of Cellulose to Hydrocarbon Fuels by Progressive Removal of Oxygen", Applied Catalysis B: Environmental, vol. 100, Aug. 2010, pp. 184-189.
Lange, Jean-Paul et al, "Valeric Biofuels: A Platform of Cellulosic Transportation Fuels", Angewandte Chemie, vol. 49, May 2010, pp. 4479-4483.
Huber, George W. et al, "Production of Liquid Alkanes by Aqueous Phase Processing of Biomass Derived Carbohydrates", Science, vol. 308, May 2005, pp. 1446-1450.
Huber, George W. et al, "Renewable Alkanes by Aqueous Phase Reforming of Biomass Derived Oxygenates", Scenice, vol. 43, Dec. 2004, pp. 1549-1551.
Valenzuela, Mariefel B. et al, "Batch Aqueous Phase Reforming of Woody Biomass", Energy & Fuels, vol. 20, Jun. 2006, pp. 1744-1752.
Davda, R.R. et al, A Review of Catalytic Issues and Process Conditions for Renewable Hydrogen and Alkanes by Aqueous-Phase Reforming of Oxygenated Hydrocarbons Over Supported Metal Catalysis, Applied Catalysis B: Environmental, vol. 56, Oct. 2004, pp. 171-186.
Barbarino, Elisabete et al, "An Evaluation of Methods for Extraction and Quantification of Protein from Marine Macro and Microalgae", Journal of Applied Phycology, vol. 17, Dec. 2005, pp. 447-460.

* cited by examiner

*Primary Examiner* — Paul Holland

(57) ABSTRACT

A method to produce biofuels from biomass is provide by contacting the biomass with an aqueous media to form an extracted biomass, separating at least a portion of an aqueous liquor from the extracted biomass thereby providing the aqueous liquor stream comprising soluble carbohydrates; contacting the aqueous liquor stream with a purification substrate effective to remove sulfur compounds and nitrogen compounds thereby producing a treated carbohydrate stream having less than 35% of the sulfur content and less than 35% of the nitrogen content of the untreated aqueous liquor feed, based on the untreated aqueous liquor stream, then contacting the treated carbohydrate stream with an aqueous phase reforming catalyst to form a plurality of oxygenated intermediates; and processing at least a portion of the oxygenated intermediates to form a liquid fuel.

13 Claims, 1 Drawing Sheet

PROCESS TO PRODUCE BIOFUELS FROM BIOMASS

The present application claims the benefit of U.S. Provisional Patent Application Ser. No. 61/424,816 filed Dec. 20, 2010, the entire disclosure of which is hereby incorporated by reference.

FIELD OF THE INVENTION

The invention relates to the production of higher hydrocarbons suitable for use in transportation fuels and industrial chemicals from biomass.

BACKGROUND OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates. However, production of fuel from cellulose poses a difficult technical problem. Some of the factors for this difficulty are the physical density of lignocelluloses (like wood) that can make penetration of the biomass structure of lignocelluloses with chemicals difficult and the chemical complexity of lignocelluloses that lead to difficulty in breaking down the long chain polymeric structure of cellulose into carbohydrates that can be used to produce fuel.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provide the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, and vegetable oil, and gaseous fuels, such as hydrogen and methane, these fuels require either new distribution technologies and/or combustion technologies appropriate for their characteristics. The production of some of these fuels also tends to be expensive and raise questions with respect to their net carbon savings.

Carbohydrates are the most abundant, naturally occurring biomolecules. Plant materials store carbohydrates either as sugars, starches, celluloses, lignocelluloses, hemicelluloses, and any combination thereof. In one embodiment, the carbohydrates include monosaccharides, polysaccharides or mixtures of monosaccharides and polysaccharides. As used herein, the term "monosaccharides" refers to hydroxy aldehydes or hydroxy ketones that cannot be hydrolyzed to smaller units. Examples of monosaccharides include, but are not limited to, dextrose, glucose, fructose and galactose. As used herein, the term "polysaccharides" refers to saccharides comprising two or more monosaccharide units. Examples of polysaccharides include, but are not limited to, cellulose, sucrose, maltose, cellobiose, and lactose. Carbohydrates are produced during photosynthesis, a process in which carbon dioxide is converted into organic compounds as a way to store energy. The carbohydrates are highly reactive compounds that can be easily oxidized to generate energy, carbon dioxide, and water. The presence of oxygen in the molecular structure of carbohydrates contributes to the reactivity of the compound. Water soluble carbohydrates react with hydrogen over catalyst(s) to generate polyols and sugar alcohols, either by hydrogenation, hydrogenolysis or both.

U.S. Publication Nos. 20080216391 and 20100076233 to Cortright et al. describes a process for converting carbohydrates to higher hydrocarbons by passing carbohydrates through a hydrogenation reaction followed by an Aqueous Phase Reforming ("APR") process. The hydrogenation reaction produces polyhydric alcohols that can withstand the conditions present in the APR reaction. Further processing in an APR reaction and a condensation reaction can produce a higher hydrocarbon for use as a fuel. Currently APR is limited to feedstocks including sugars or starches, which competes with the use of these materials for food resulting in a limited supply. There is a need to directly process biomass into liquid fuels.

SUMMARY OF THE INVENTION

In an embodiment, a method comprises: (i) providing a biomass containing celluloses, hemicelluloses and lignin; (ii) contacting the biomass with an aqueous media to form an extracted biomass comprising celluloses, hemicelluloses, soluble carbohydrates and lignin; (iii) separating at least a portion of an aqueous liquor from the extracted biomass thereby providing the aqueous liquor stream comprising soluble carbohydrates and an extracted biomass solids stream comprising celluloses, hemicelluloses, and lignin; (iv) contacting the aqueous liquor stream with a purification substrate effective to remove sulfur compounds and nitrogen compounds thereby producing a treated carbohydrate stream having less than 35% of the sulfur % of the sulfur content and less than 35% of the nitrogen content of the untreated aqueous liquor feed; (v) contacting the treated carbohydrate stream with an aqueous phase reforming catalyst to form a plurality of oxygenated intermediates, and (vi) processing at least a portion of the oxygenated intermediates to form a liquid fuel.

In yet another embodiment, a first portion of the oxygenated intermediates are recycled to form in part the aqueous media; and processing at least a second portion of the oxygenated intermediates to form a liquid fuel.

In yet another embodiment, the extracted biomass solids stream is further processed to produce pulp useful for producing paper.

In yet another embodiment, the extracted biomass solids stream is further digested, hydrolyzed and fermented to produce alcohol.

In yet another embodiment, a system comprises: a vessel that receives a biomass feedstock and an aqueous media operating under conditions effective to produce an extracted biomass comprising celluloses, hemicelluloses, soluble carbohydrates and lignin and discharges an aqueous liquor stream comprising soluble carbohydrates; a soluble carbohydrate treater comprising a purification substrate that receives the aqueous liquor and discharges a treated carbohydrate stream having less than 35% of the sulfur content and less than 35% of the nitrogen content of the untreated aqueous liquor feed; an aqueous phase reforming reactor comprising an aqueous phase reforming catalyst that receives the treated stream and discharges an oxygenated intermediate stream, wherein a first portion of the oxygenated intermediate stream is recycled to the vessel as at least a portion of the aqueous media; and a fuels processing reactor comprising a condensation catalyst that receives a second portion of the oxygenated intermediate stream and discharges a liquid fuel.

In yet another embodiment, a system comprises: a vessel that receives a biomass feedstock and an aqueous media operating under conditions effective to produce an extracted biomass comprising celluloses, hemicelluloses, soluble carbohydrates and lignin and discharges an aqueous liquor stream comprising soluble carbohydrates; a soluble carbohydrate treater comprising a purification substrate that receives the aqueous liquor and discharges a treated carbohydrate stream having less than 35% of the sulfur content and less than 35% of the nitrogen content of the untreated aqueous liquor feed; an aqueous phase reforming reactor comprising an aqueous phase reforming catalyst that receives the treated stream and discharges an oxygenated intermediate stream, wherein a first portion of the oxygenated intermediate stream is recycled to a digester as at least a portion of a digestive solvent to further process and produce a purified solid pulp; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

DETAILED DESCRIPTION OF THE INVENTION

Figure 1:
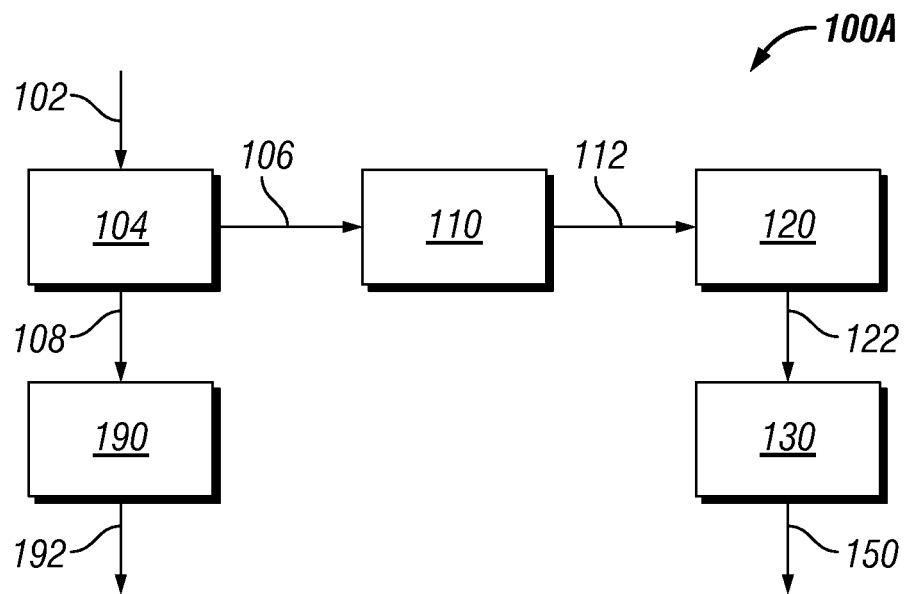
FIG. 1 schematically illustrates a block flow diagram of an embodiment of a higher hydrocarbon production process of this invention.

The invention relates to the production of higher hydrocarbons suitable for use in transportation fuels and industrial chemicals from biomass. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the biomass feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (e.g., oxygen or sulfur) and thus the term "hydrocarbon" may also include substituted hydrocarbons. The term "soluble carbohydrates" refers to oligosaccharides and monosaccharides that are soluble in the digestive solvent and that can be used feedstock to the APR reaction (e.g., pentoses and hexoses).

The methods and systems of the invention have an advantage of pretreating a raw biomass feedstock with an aqueous media to produce an aqueous liquor stream containing soluble carbohydrates that are further treated to remove substantial amount of nitrogen compounds and sulfur compounds and optionally phosphorus compounds contained in the biomass that tend to poison the catalysts prior to aqueous reforming processing. The treated biomass is then converted by aqueous phase reforming reactions to form an oxygenated intermediate stream comprising polyols, alcohols, ketones, aldehydes, and other oxygenated reaction products that can be fed directly to a processing reaction to form higher hydrocarbons, which results in an increased conversion and conversion efficiency by minimizing catalyst poisoning and extend the catalyst life.

In some embodiments, at least a portion of oxygenated intermediates produced in the APR reaction are recycled within the process and system to at least in part form the in situ generated solvent, which is used in the aqueous media of the pretreatment process. This recycle saves costs and can increase the amount of carbohydrates extracted from the biomass feedstock. Further, by controlling the degradation of carbohydrate in the APR process, the hydrogenation reaction can be conducted along with the APR reaction at temperatures ranging from about 175° C. to about 275° C. As a result, a separate hydrogenation reaction can be avoided and the fuel forming potential of the biomass feedstock fed to the process can be increased. This process and reaction scheme described herein also results in a capital cost savings and process operational cost savings. Advantages of specific embodiments will be described in more detail below.

In some embodiments, the invention provides methods comprising: providing a biomass containing celluloses, hemicelluloses and lignin; contacting the biomass with an aqueous media to form an extracted biomass comprising celluloses, hemicelluloses, soluble carbohydrates and lignin; separating at least a portion of an aqueous liquor from the extracted biomass thereby providing the aqueous liquor stream comprising soluble carbohydrates and an extracted biomass solids stream comprising celluloses, hemicelluloses, and lignin; contacting the aqueous liquor stream with a purification substrate effective to remove sulfur compounds and nitrogen compounds thereby producing a treated carbohydrate stream having less than 35% of the sulfur content and less than 35% of the nitrogen content of the untreated aqueous liquor feed; contacting the treated carbohydrate stream with an aqueous phase reforming catalyst to form a plurality of oxygenated intermediates, wherein a first portion of the oxygenated intermediates are recycled to form the solvent; and contacting at least a second portion of the oxygenated intermediates with a catalyst comprising a base functionality to form a liquid fuel.

In reference to FIG. 1, in one embodiment of the invention process 100A, biomass 102 is provided to pretreat system 104 whereby the biomass is contacted with an aqueous media to form an extracted biomass that can be separated to an aqueous liquor stream 106 containing at least a portion of the soluble carbohydrates, nitrogen compounds and sulfur compounds and an extracted biomass solids stream 108 comprising celluloses, hemicelluloses, and lignin. The aqueous liquor 106 from the extracted biomass is provided to treatment system 110 where the aqueous liquor is contacted with the purification substrate to produce a treated carbohydrate steam 112 containing soluble carbohydrates having less than 35% of the sulfur content, preferably less than 10% of the sulfur content, and less than 35% of the nitrogen content of the untreated aqueous liquor feed, preferably less than 10% of nitrogen content, based on the untreated aqueous liquor stream. At least a portion of the treated carbohydrate stream 112 is fed to an aqueous phase reforming system 120 containing an aqueous reforming catalyst to produce a plurality of oxygenated intermediates 122, and at least a portion of the oxygenated intermediates is provided to processing system 130 to produce higher hydrocarbons to form a liquid fuel 150. The extracted biomass solids stream 108 is provided to a digestive system 190 whereby the pretreated solid biomass is contacted with a digestive media to further process the extracted biomass solids into pulps 192 that may be further processed to produce paper, chemicals and/or biofuels.

Figure 2:
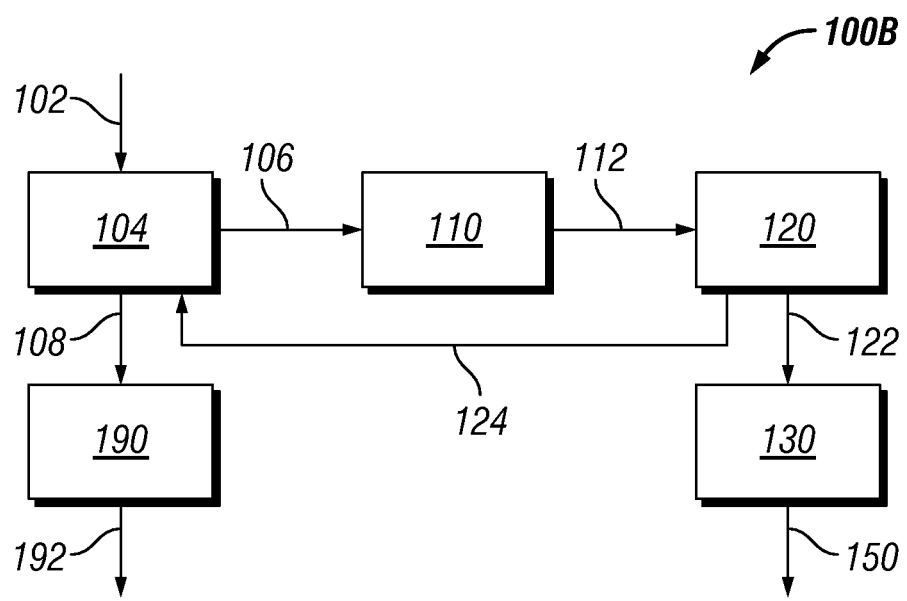
FIG. 2 schematically illustrates a block flow diagram of an embodiment of a higher hydrocarbon production process of this invention in which recycle of an intermediate oxygenates stream is employed.

In reference to FIG. 2, in one embodiment of the invention process 100B, biomass 102 is provided to pretreat system 104 whereby the biomass is contacted with an aqueous media to form an extracted biomass that can be separated to an aqueous liquor stream 106 containing at least a portion of the soluble carbohydrates, nitrogen compounds and sulfur compounds and an extracted biomass solids stream 108 comprising celluloses, hemicelluloses, and lignin. The aqueous liquor stream 106 from the extracted biomass is provided to treatment system 110 where the aqueous liquor is contacted with the purification substrate to produce a treated carbohydrate steam 112 containing soluble carbohydrates having less than 35% of the sulfur content, preferably less than 10% of the sulfur content, and less than 35% of the nitrogen content of the untreated aqueous liquor feed, preferably less than 10% of nitrogen content, based on the untreated aqueous liquor stream. At least a portion of the treated carbohydrate stream 112 is fed to an aqueous phase reforming system 120 containing an aqueous phase reforming catalyst to produce a plurality of oxygenated intermediates 122, and at least a first portion of the oxygenated intermediates is provided to processing system 130 to produce higher hydrocarbons to form a liquid fuel 150 and second portion of the oxygenated intermediate is recycled 124 to the aqueous media in system 104. The extracted biomass solids stream 108 is provided to a digestive system 190 whereby the pretreated solid biomass is contacted with a digestive media to further process the extracted biomass solids into pulps 192 that may be further process to produce paper, chemicals and/or biofuels.

Any suitable (e.g., inexpensive and/or readily available) type of biomass can be used. Suitable lignocellulosic biomass can be, for example, selected from, but not limited to, forestry residues, agricultural residues, herbaceous material, municipal solid wastes, waste and recycled paper, pulp and paper mill residues, and combinations thereof. Thus, in some embodiments, the biomass can comprise, for example, corn stover, straw, bagasse, miscanthus, sorghum residue, switch grass, bamboo, water hyacinth, hardwood, hardwood chips, hardwood pulp, softwood, softwood chips, softwood pulp, and/or combination of these feedstocks. The biomass can be chosen based upon a consideration such as, but not limited to, cellulose and/or hemicelluloses content, lignin content, growing time/season, growing location/transportation cost, growing costs, harvesting costs and the like.

Prior to the pretreatment with the aqueous media, the biomass can be washed and/or reduced in size (e.g., chopping, crushing or debarking) to a convenient size and certain quality that aids in moving the biomass or mixing and impregnating the chemicals from digestive solvent. Thus, in some embodiments, providing biomass can comprise harvesting a lignocelluloses-containing plant such as, for example, a hardwood or softwood tree. The tree can be subjected to debarking, chopping to wood chips of desirable thickness, and washing to remove any residual soil, dirt and the like.

In the pretreat system, the size-reduced biomass is contacted with the aqueous media in at least one vessel where the pretreatment takes place. The aqueous media must be effective to produce at least some soluble carbohydrate. The amount of soluble carbohydrate formation may vary depending on the aqueous media and temperature and time of contact with the biomass.

In one aspect of the embodiment, the aqueous media may be (i) water that may optionally contain (ii) water soluble organic solvents such as, for example, alcohols having a carbon number of 1 to 6 such as methanol, ethanol, and propanol, and branched alcohols such as 2-methyl pentanol; diols having a carbon number less than 6 such as ethylene glycol and 1,2-propylene glycol, ketones having a carbon number of 1 to 5 such as acetone, and methyl ethyl ketone, and aldehydes having a carbon number of 1 to 5 such as formaldehyde, acetaldehyde, propanal, butanal; acids having a carbon number of 1 to 6 such as formic acid, acetic acid, propionic acid, butyric acid and any mixtures thereof. Cyclic ethers such as tetrahydrofuran, methyl tetrahydrofurans may be present. The water soluble organic solvent may be present in the aqueous media in an amount of at least 0.1 wt %, more preferably at least 2 wt % to 10 wt %, most preferably to about 50 wt %, based on the aqueous media. The aqueous media to biomass ratio can be within the range of 1 to 20, preferably 3 to 5. The pretreatment reaction can be carried out at a temperature within the range of about 60° C. to 240° C., most preferably within a range of about 110° C. to about 210° C., and preferably a residence time within about 0.5 h to 5 h. The reaction is carried out under conditions effective to provide an aqueous liquor containing soluble carbohydrate content of at least 1% by weight.

In some embodiments, the reactions are carried out in any system of suitable design, including systems comprising continuous-flow, batch, semi-batch or multi-system vessels and reactors. One or more reactions may take place in an individual vessel and the process is not limited to separate reaction vessels for each reaction. In some embodiments the system of the invention utilizes a fluidized catalytic bed system. Preferably, the invention is practiced using a continuous-flow system at steady-state equilibrium.

Nitrogen compounds and sulfur compounds may act as a poison to the aqueous reforming catalyst that processes the soluble carbohydrates to liquid fuels. The aqueous liquor stream that contains the soluble carbohydrates and nitrogen compounds and sulfur compounds are contacted with a purification substrate effective to remove sulfur compounds and nitrogen compounds to produce a treated carbohydrate stream having less than 35% of the sulfur content, preferably less than 10% of the sulfur content, more preferably less than 5%, most preferably less than 3%, and less than 35% of the nitrogen content of the untreated aqueous liquor feed, preferably less than 10% of nitrogen content, more preferably less than 5%, most preferably less than 3%, based on the untreated aqueous liquor stream. The purification substrate may be any substrate that is effective to remove nitrogen compounds and sulfur compounds while not reactive (inert) to the soluble carbohydrates. The purification substrate may be, for example, activated carbons, aluminas, silicas, silica-aluminas, clay minerals, diatomatious earth, zirconia, titania, polymeric adsorbents such as XAD-4 or XAD-7 from Rohm and Haas, or especially ion-exchange resins including strong acid cationic resins such as Dowex 88, Purolite C-150 or C-160S, Amberlite IR-120, A-32, FP-C22, anionic base resins such as Dowex 22 or 77, Amberlite A-26, or FP-A90, or especially mixed bed resins such as Amberlite MB-150, or Amberlite MB-20, Purolite A-510S and C-150S, or Dowex 88-MB and Dowex 22, or Dowex 50-MB.

In certain embodiments, an optional preliminary water wash or rinse to remove salts can occur at a temperature in the range of from 15° C. to 60° C. Pretreatment with aqueous media will occur at a temperature above about 60° C., and a pressure between 1 atm and 100 atm absolute pressure, with a residence time of at least 0.5 hours, or a volume hourly space velocity defined as the volume of liquid treater per volume of resin per hour, of between 1 and 10.

In some embodiments, the aqueous media may contain an in situ generated solvent. Each in situ generated solvent component may be supplied by an external source, generated within the process, and recycled to the pretreat vessel, or any combination thereof. For example, a portion of the oxygenated intermediates produced in the APR reaction may be separated in the separator stage for use as the in situ generated water-soluble organic solvent in the pretreat reaction. In an embodiment, the in situ generated solvent can be separated, stored, and selectively injected into the recycle stream so as to maintain a desired concentration in the recycle stream.

Each reactor vessel of the invention preferably includes an inlet and an outlet adapted to remove the product stream from the vessel or reactor. In some embodiments, the vessel in which at least some digestion occurs may include additional outlets to allow for the removal of portions of the reactant stream. In some embodiments, the vessel in which at least some digestion occurs may include additional inlets to allow for additional solvents or additives.

The relative composition of the various carbohydrate components in the treated carbohydrate stream affects the formation of undesirable by-products such as heavy ends or tars in the APR reaction. In particular, a low concentration of reactive carbohydrates such as monomeric sugar molecules in the treated carbohydrate stream can minimize the formation of unwanted by-products. In preferred embodiments, it is desirable to have a concentration of no more than about 10 wt %, based upon total liquid, of readily degradable, reactive carbohydrates such as sugars and less than about 35% of the nitrogen and less than about 35% of in the sulfur compound content, based on the mass flowrate of the untreated carbohydrate stream, in the treated carbohydrate stream, while maintaining a total organic intermediates concentration, which can include the oxygenated intermediates (e.g., monooxygenates, diols, and/or polyols and sugar alcohols) concentration as high as possible via use of the recycle concept.

APR converts polyhydric alcohols to carbonyls and/or aldehydes, which react over a catalyst with water to form hydrogen, carbon dioxide, and oxygenated intermediates, which comprise smaller alcohols (e.g., monohydric and/or polyhydric alcohols) such as, for example, disclosed in U.S. Publication No. 20080216391 which disclosure is herein incorporated by reference. The alcohols can further react through a series of deoxygenation reactions to form additional oxygenated intermediates that can produce higher hydrocarbons through a processing reaction such as a condensation reaction.

Referring again to FIG. 1, according to one embodiment, the treated carbohydrate stream 112 from the removal system 110 can be passed to an APR reaction to produce oxygenated intermediates. The treated carbohydrate stream 112 may comprise C5 and C6 carbohydrates that can be reacted in the APR reaction. For embodiments comprising thermocatalytic APR, oxygenated intermediates such as sugar alcohols, sugar polyols, carboxylic acids, ketones, and/or furans can be converted to fuels in a further processing reaction. The APR reaction can comprise an APR catalyst to aid in the reactions taking place. The APR reaction conditions can be such that an APR reaction can take place along with a hydrogenation reaction, a hydrogenolysis reaction, or both as many of the reaction conditions overlap or are complimentary. The various reactions can result in the formation of one or more oxygenated intermediate streams 122. As used herein, an "oxygenated intermediate" can include one or more polyols, alcohols, ketones, or any other hydrocarbon having at least one oxygen atom.

In some embodiments, the APR catalysts can be a heterogeneous catalyst capable of catalyzing a reaction between hydrogen and carbohydrate, oxygenated intermediate, or both to remove one or more oxygen atoms to produce in-situ hydrogen for APR and to produce alcohols and polyols to be fed to the condensation reactor. The APR catalyst can generally include Cu, Re, Ni, Fe, Co, Ru, Pd, Rh, Pt, Os, Ir, Sn, and alloys or any combination thereof, either alone or with promoters such as W, Mo, Au, Ag, Cr, Zn, Mn, B, P, Bi, and alloys or any combination thereof. Other effective APR catalyst materials include either supported nickel or ruthenium modified with rhenium. In some embodiments, the APR catalyst also includes any one of the supports, depending on the desired functionality of the catalyst. The APR catalysts may be prepared by methods known to those of ordinary skill in the art. In some embodiments the APR catalyst includes a supported Group VIII metal catalyst and a metal sponge material (e.g., a sponge nickel catalyst). Raney nickel provides an example of an activated sponge nickel catalyst suitable for use in this invention. In some embodiments, the APR reaction in the invention is performed using a catalyst comprising a nickel-rhenium catalyst or a tungsten-modified nickel catalyst. One example of a suitable catalyst for the APR reaction of the invention is a carbon-supported nickel-rhenium catalyst.

In some embodiments, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (e.g., molybdenum or chromium) in the amount such that 1 to 2 weight % remains in the formed sponge nickel catalyst. In another embodiment, the APR catalyst is prepared using a solution of ruthenium (III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the APR catalyst may include a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

The conditions for which to carry out the APR reaction will vary based on the type of starting material and the desired products. In general, the APR reaction is conducted at temperatures of 80° C. to 300° C., and preferably at 120° C. to 300° C., and most preferably at 200° C. to 280° C. In some embodiments, the APR reaction is conducted at pressures from 500 kPa to 14000 kPa.

The APR reaction can optionally be conducted with pre-addition of a fraction of the hydrogen required for conversion, to facilitate hydrogenation reactions which are advantageous in converting species containing less stable carbonyl groups such as monosaccharides to more stable alcohols such as sugar alcohols. The hydrogen may be supplied from an external source, or via recycle of excess hydrogen formed in the APR reaction section, after initiation of the reaction sequence.

The APR product stream 122 may comprise APR products that include oxygenated intermediates. As used herein, "oxygenated intermediates" generically refers to hydrocarbon compounds having one or more carbon atoms and between one and three oxygen atoms (referred to herein as $C_{1+}O_{1-3}$ hydrocarbons), such as ketones, aldehydes, furans, hydroxy carboxylic acids, carboxylic acids, alcohols, diols and triols. Preferably, the oxygenated intermediates have from one to six carbon atoms, or two to six carbon atoms, or three to six carbon atoms. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, and isomers thereof. The aldehydes may include, without limitation, hydroxyaldehydes, acetaldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Alcohols may include, without limitation, primary, secondary, linear, branched or cyclic C1+ alcohols, such as methanol, ethanol, n-propyl alcohol, isopropyl alcohol, butyl alcohol, isobutyl alcohol, butanol, pentanol, cyclopentanol, hexanol, cyclohexanol, 2-methyl-cyclopentanonol, heptanol, octanol, nonanol, decanol, undecanol, dodecanol, and isomers thereof. The diols may include, without limitation, ethylene glycol, propylene glycol, 1,3-propanediol, butanediol, pentanediol, hexanediol, heptanediol, octanediol, nonanediol, decanediol, undecanediol, dodecanediol, and isomers thereof. The triols may include, without limitation, glycerol, 1,1,1 tris(hydroxymethyl)-ethane (trimethylolethane), trimethylolpropane, hexanetriol, and isomers thereof. In an embodiment, any alcohols, diols, triols are dehydrogenated in a dehydrogenation reaction to produce a carbonyl useful in an aldol condensation reaction. Furans and furfurals include, without limitation, furan, tetrahydrofuran, dihydrofuran, 2-furan methanol, 2-methyl-tetrahydrofuran, 2,5-dimethyl-tetrahydrofuran, 2-methyl furan, 2-ethyl-tetrahydrofuran, 2-ethyl furan, hydroxylmethylfurfural, 3-hydroxytetrahydrofuran, tetrahydro-3-furanol, 2,5-dimethyl furan, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof.

The oxygenated intermediate stream may generally be characterized as comprising components corresponding to the formula: CnOmHx. In an embodiment, n=1-6 and m=1 to 6, m≤n, and x is an integer that completes the molecular structure (e.g., between 1 and 2n+2). Other elements such as nitrogen or sulfur may also be present in these molecules. Additional components that may be present in the APR products stream can include hydrogen and other gases such as carbon dioxide. These components can be separated from the oxygenated intermediates or they can be fed to the condensation reaction for removal after the condensation reaction.

The oxygenated intermediate stream 122 may then pass from the APR reaction to an further processing stage 130. In some embodiments, optional separation stage includes elements that allow for the separation of the oxygenated intermediates into different components. In some embodiments of the present invention, the separation stage can receive the oxygenated intermediate stream 122 from the APR reaction and separate the various components into two or more streams. For example, a suitable separator may include, but is not limited to, a phase separator, stripping column, extractor, or distillation column. In some embodiments, a separator is installed prior to a processing reaction to favor production of higher hydrocarbons by separating the higher polyols from the oxygenated intermediates. In such an embodiment, the higher polyols can be recycled back through to the APR reaction, while the other oxygenated intermediates are passed to the processing reaction 130. In addition, an outlet stream from the separation stage containing a portion of the oxygenated intermediates may act as in situ generated solvent when recycled to the pretreat system 104. In one embodiment, the separation stage can also be used to remove some or all of the lignin from the oxygenated intermediate stream. The lignin may be passed out of the separation stage as a separate stream, for example as output stream.

The APR recycle stream 124 can comprise a number of components including in situ generated solvents, which may be useful as the soluble organic solvent at least in part or in entirety. The term "in situ" as used herein refers to a component that is produced within the overall process; it is not limited to a particular reactor for production or use and is therefore synonymous with an in process generated component. The in situ generated solvents may comprise oxygenated intermediates. The composition of the intermediate carbohydrate stream 122 may vary and may comprise a number of different compounds. Preferably, the carbohydrates have 2 to 12 carbon atoms, and even more preferably 2 to 6 carbon atoms. The carbohydrates may also have an oxygen to carbon ratio from 0.5:1 to 1:1.2.

Organic in situ generated solvents, which may comprise a portion of the oxygenated intermediates, including, but not limited to, light alcohols and polyols, can assist in solubilization and extraction of lignin and other components.

The oxygenated intermediates can be processed to produce a fuel blend in one or more processing reactions. In an embodiment, a condensation reaction can be used along with other reactions to generate a fuel blend and may be catalyzed by a catalyst comprising acid or basic functional sites, or both. In general, without being limited to any particular theory, it is believed that the basic condensation reactions generally consist of a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a C4+ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. A catalyst comprising a basic functional site, an acidic functional site, both an acid and a basic functional site, and optionally comprising a metal function, may be used to effect the condensation reaction.

In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 can be defined as jet fuel.

In certain embodiments, both aviation fuels (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A are used for civilian and military fuels and DCI-6A is used for military fuels. FSII agents, include, e.g., Di-EGME.

In an embodiment, the oxygenated intermediates may comprise a carbonyl-containing compound that can take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream can be dehydrogenated in the presence of a catalyst.

In an embodiment, a dehydrogenation catalyst may be preferred for an oxygenated intermediate stream comprising alcohols, diols, and triols. In general, alcohols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation or aqueous phase reforming, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction results in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrolidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediate stream. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction can be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings can be opened in the presence of an acid functionality and reacted in an aldol condensation reaction using a base or acid functionality. Such a concerted reaction scheme may allow for the production of a greater amount of higher hydrocarbons to be formed for a given oxygenated intermediate feed.

In an embodiment, production of a C4+ compound occurs by condensation, which may include aldol-condensation, of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a C9 species, which may subsequently react with another hydroxymethylfurfural molecule to form a C15 species. The reaction is usually carried out in the presence of a condensation catalyst. The condensation reaction may be carried out in the vapor or liquid phase. In an embodiment, the reaction may take place at a temperature in the range of from about 5° C. to about 375° C., depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises a mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof. Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and Al2O3 to form a hydrotalcite material. Another preferred material contains a combination of MgO and ZrO2, or a combination of ZnO and Al2O3. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes. Zinc oxide, alumina, and a peptizing agent may also be mixed together and extruded to produce a formed material. After drying, this material is calcined at a temperature appropriate for formation of the catalytically active phase, which usually requires temperatures in excess of 452° C. Other catalyst supports as known to those of ordinary skill in the art may also be used.

In some embodiments, a dehydration catalyst, a dehydrogenation catalyst, and the condensation catalyst can be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements can comprise any of those listed above with respect to the dehydration catalyst, dehydrogenation catalyst, and the condensation catalyst. Alternately, a physical mixture of dehydration, dehydrogenation, and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific C4+ compounds produced in the condensation reaction will depend on various factors, including, without limitation, the type of oxygenated intermediates in the reactant stream, condensation temperature, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of oxygenated intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 10 kPa, and the thermodynamics of the reaction are favorable. The condensation temperature will vary depending upon the specific oxygenated intermediates used, but is generally in the range of from about 75° C. to 500° C. for reactions taking place in the vapor phase, and more preferably from about 125° C. to 450° C. For liquid phase reactions, the condensation temperature may be from about 5° C. to 475° C., and the condensation pressure from about 0.1 kPa to 10,000 kPa. Preferably, the condensation temperature is between about 15° C. and 300° C., or between about 15° C. and 250° C. for difficult substrates.

Varying the factors above, as well as others, will generally result in a modification to the specific composition and yields of the C4+ compounds. For example, varying the temperature and/or pressure of the reactor system, or the particular catalyst formulations, may result in the production of C4+ alcohols and/or ketones instead of C4+ hydrocarbons. The C4+ hydrocarbon product may also contain a variety of olefins, and alkanes of various sizes (typically branched alkanes).

Depending upon the condensation catalyst used, the hydrocarbon product may also include aromatic and cyclic hydrocarbon compounds. The C4+ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols. The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include an optional dehydrogenation bed adapted to produce dehydrogenated oxygenated intermediates, an optional dehydration bed adapted to produce dehydrated oxygenated intermediates, and a condensation bed to produce C4+ compounds from the oxygenated intermediates. The dehydrogenation bed is configured to receive the reactant stream and produce the desired oxygenated intermediates, which may have an increase in the amount of carbonyl-containing compounds. The de-hydration bed is configured to receive the reactant stream and produce the desired oxygenated intermediates. The condensation bed is configured to receive the oxygenated intermediates for contact with the condensation catalyst and production of the desired C4+ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction byproducts for use in other portions of the system. In an embodiment, the reactor system also includes additional inlets to allow for the introduction of supplemental materials to further advance or direct the reaction to the desired reaction products, and to allow for the recycling of reaction byproducts for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the $C_7$-$C_{14}$ fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof.

Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80° C. to 250° C., and finishing pressures in the range of about 700 kPa to 15,000 kPa. In one embodiment, the finishing step is conducted in the vapor phase or liquid phase, and uses in situ generated $H_2$ (e.g., generated in the APR reaction step), external $H_2$, recycled $H_2$, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in a counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and Al2O3 or SiO2. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation step so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

Yet in another embodiment of the invention, the $C_{2+}$ olefins are produced by catalytically reacting the oxygenated intermediates in the presence of a dehydration catalyst at a dehydration temperature and dehydration pressure to produce a reaction stream comprising the $C_{2+}$ olefins. The $C_{2+}$ olefins comprise straight or branched hydrocarbons containing one or more carbon-carbon double bonds. In general, the $C_{2+}$ olefins contain from 2 to 8 carbon atoms, and more preferably from 3 to 5 carbon atoms. In one embodiment, the olefins comprise propylene, butylene, pentylene, isomers of the foregoing, and mixtures of any two or more of the foregoing. In another embodiment, the $C_{2+}$ olefins include $C_{4+}$ olefins produced by catalytically reacting a portion of the $C_{2+}$ olefins over an olefin isomerization catalyst. In an embodiment, a method of forming a fuel blend from a biomass feedstock may comprise a digester that receives a biomass feedstock and a digestive solvent operating under conditions to effectively remove nitrogen and sulfur compounds from said biomass feedstock and discharges a treated stream comprising a carbohydrate having less than 35% of the sulfur content and less than 35% of the nitrogen content based on the untreated biomass feedstock on a dry mass basis; an aqueous phase reforming reactor comprising an aqueous phase reforming catalyst that receives the treated stream and discharges an oxygenated intermediate, wherein a first portion of the oxygenated intermediate stream is recycled to the digester as at least a portion of the digestive solvent; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

The dehydration catalyst comprises a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst further comprises a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst further comprises an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst comprises an aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst comprises a bifunctional pentasil ring-containing aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction is conducted at a temperature and pressure where the thermodynamics are favorable. In general, the reaction may be performed in the vapor phase, liquid phase, or a combination of both. In one embodiment, the dehydration temperature is in the range of about 100° C. to 500° C., and the dehydration pressure is in the range of about 5 kPa to 6500 kPa. In another embodiment, the dehydration temperature is in the range of about 125° C. to 450° C., and the dehydration pressure is at least 100 kPa. In another version, the dehydration temperature is in the range of about 150° C. to 350° C., and the dehydration pressure is in the range of about 750 kPa to 15,000 kPa. In yet another version, the dehydration temperature is in the range of about 175° C. to 325° C.

The $C_{6+}$ paraffins are produced by catalytically reacting the $C_{2+}$ olefins with a stream of $C_{4+}$ isoparaffins in the presence of an alkylation catalyst at an alkylation temperature and alkylation pressure to produce a product stream comprising $C_{6+}$ paraffins. The $C_{4+}$ isoparaffins include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $C_{4+}$ isoparaffins comprises of internally generated $C_{4+}$ isoparaffins, external $C_{4+}$ isoparaffins, recycled $C_{4+}$ isoparaffins, or combinations of any two or more of the foregoing.

The $C_{6+}$ paraffins will generally be branched paraffins, but may also include normal paraffins. In one version, the $C_{6+}$ paraffins comprises a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the C.sub.6+ paraffins comprise dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst comprises a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst comprises an aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst comprises a bifunctional pentasil ring-containing aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst are atomically identical.

The alkylation reaction is conducted at a temperature where the thermodynamics are favorable. In general, the alkylation temperature is in the range of about −20° C. to 300° C., and the alkylation pressure is in the range of about 5 kPa to 8500 kPa. In one version, the alkylation temperature is in the range of about 100° C. to 300° C. In another version, the alkylation temperature is in the range of about 0° C. to 100° C., and the alkylation pressure is at least 750 kPa. In yet another version, the alkylation temperature is in the range of about 0° C. to 50° C. and the alkylation pressure is less than 2500 kPa. In still yet another version, the alkylation temperature is in the range of about 70° C. to 250° C., and the alkylation pressure is in the range of about 750 kPa to 8000 kPa. In one embodiment, the alkylation catalyst comprises a mineral acid or a strong acid and the alkylation temperature is less than 100° C. In another embodiment, the alkylation catalyst comprises a zeolite and the alkylation temperature is greater than 100° C.

In another embodiment, at least a portion of the extracted biomass solids stream can be provided to a digestive system 190 whereby the pretreated solid biomass is contacted with a digestive media to further process the extracted biomass solids into pulps 192 that may be further processed to produce paper, chemicals and/or biofuels. In one embodiment, such digestive system can be a conventional pulp and paper digesters whereby a digestive solvent is contacted with the extracted biomass solids stream and subsequently processed to produce paper as commercially practiced in the pulp and paper industry or can utilize a more recently developed digestive solvent. For example, a detailed description of conventional pulp and paper digestive system and subsequent paper production is described in Handbook for Pulp & Paper Technologists (Third Edition), G. A. Smook, published by Angus Wilde Publications Inc. Vancouver, 2002

In another embodiment, the digestive system 190 may also utilize the more recently developed or developing digestive medium to produce pulps suitable for use in producing alcohols via subsequent hydrolysis and fermentation. In one embodiment, digestive systems that may be useful in producing alcohol are described in WO2010/060052 by Jameel et al., and U.S. patent application No. 61/390,870 filed Oct. 7, 2010 by Chheda et al., which disclosures are hereby incorporated by reference. In one embodiment of such digestive system, for example, the digestive solvent maybe a Kraft-like digestive solvent that contains (i) at least 0.5 wt %, more preferably at least 4 wt % to 20 wt %, more preferably to 10 wt %, based on the digestive solvent, of at least one alkali selected from the group consisting of sodium hydroxide, sodium carbonate, sodium sulfide, potassium hydroxide, potassium carbonate, ammonium hydroxide, and mixtures thereof, (ii) optionally, 0 to 3%, based on the digestive solvent, of anthraquinone, sodium borate and/or polysulfides; and (iii) water (as remainder of the digestive solvent). In some embodiments, the digestive solvent may have an active alkali of between 5 to 25%, more preferably between 10 to 20%. The term "active alkali" (AA), as used herein, is a percentage of alkali compounds combined, expressed as sodium oxide based on weight of the biomass less water content (dry solid biomass). If sodium sulfide is present in the digestive solvent, the sulfidity can range from about 15% to about 40%, preferably from about 20 to about 30%. The term "sulfidity", as used herein, is a percentage ratio of $Na_2S$, expressed as $Na_2O$, to active alkali. The digestive solvent to biomass ratio can be within the range of about 1 to 10, preferably 3 to 5. The digestion reaction is carried out at a temperature within the range of 100° C. to 230° C., and a residence time within 0.25 h to 4 h. The reaction is carried out under conditions effective to provide a digested biomass stream containing digested biomass.

The digester can be, for example, a pressure vessel of carbon steel or stainless steel or similar alloy. The predigestion system and digestion system can be carried out in the same vessel or in a separate vessel. The cooking can be done in continuous or batch mode. Suitable pressure vessels include, but are not limited to the "PANDIA™ Digester" (Voest-Alpine Industrienlagenbau GmbH, Linz, Austria), the "DEFIBRAOR Digester" (Sunds Defibrator AB Corporation, Stockholm, Sweden), M&D (Messing & Durkee) digester (Bauer Brothers Company, Springfield, Ohio, USA) and the KAMYR Digester (Andritz Inc., Glens Falls, N.Y., USA). The digestive solvent has a pH from 10 to 14, preferably around 12 to 13 depending on AA. The pH of the system may be adjusted from acidic to the pH of the digestive solvent prior to entry of the digestion system, however, it is not necessary to do so and the predigested biomass stream may be directly contacted with the digestive solvent. The contents can be kept at a temperature within the range of from 100° C. to 230° C. for a period of time, more preferably within the range from about 130° C. to about 180° C. The period of time can be from about 0.25 to 4.0 hours, preferably from about 0.5 to about 2 hours, after which the pretreated contents of the digester are discharged. For adequate penetration, a sufficient volume of liquor is required to ensure that all the chip surfaces are wetted. Sufficient liquor is supplied to provide the specified digestive solvent to biomass ratio. The effect of greater dilution is to decrease the concentration of active chemical and thereby reduce the reaction rate.

In one embodiment, the produced pulp from the digestive system maybe optionally subjected to washing then subjected to enzymatic hydrolysis to produce fermentable sugar. The fermentable sugar may be subjected to formation to produce alcohols that maybe useful as biofuel. The washing, further processing, enzymatic hydrolysis and fermentation described in 61/390,870 filed Oct. 7, 2010 by Chheda et al., which disclosure is hereby incorporated by reference, can be used to process the pulp to alcohol.

In this embodiment, the more easily extractable but more difficult to ferment carbohydrates present in hemicelluloses, are extracted and sent to an aqueous phase reforming reactor to form the mono-oxygenates which can be further processed to liquid fuels. The non-extracted biomass components comprising the pulp and typically comprising the cellulose fraction, are more readily fermented to alcohols.

In yet another embodiment, the extracted biomass stream 108 may be further processed to form a liquid fuel such as described in the co-pending application filed on the same date by Chheda et al. by removing sulfur compounds and nitrogen compounds from the extracted biomass 108 by contacting the biomass with a digestive solvent to form a treated biomass then contacting the treated biomass with an aqueous phase reforming catalyst to form a plurality of oxygenated intermediates, and then processing at least a portion of the oxygenated intermediates as described above to form a liquid fuel.

In an embodiment of the present invention, the fuel yield of the current process may be greater than other bio-based feedstock conversion processes. Without wishing to be limited by theory, it is believed that substantially removing nitrogen compounds and sulfur compounds from the soluble carbohydrate prior to the direct APR allows for a greater percentage of the biomass to be converted into higher hydrocarbons while limiting the formation of degradation products, and limiting the deactivation of APR catalysts To facilitate a better understanding of the present invention, the following examples of certain aspects of some embodiments are given. In no way should the following examples be read to limit, or define, the entire scope of the invention.

EXAMPLES

Catalyst poisoning, biomass extraction, pretreatment, digestion and reaction studies were conducted in a Parr5000 Hastelloy multireactor comprising 6×75-milliliter reactors operated in parallel at pressures up to 14,000 kPa, and temperatures up to 275° C., stirred by magnetic stir bar. Alternate studies were conducted in 100-ml Parr4750 reactors, with mixing by top-driven stir shaft impeller, also capable of 14,000 kPa and 275° C. Larger scale extraction, pretreatment and digestion tests were conducted in a 1-Liter Parr reactor with annular basket housing biomass feed, or with filtered dip tube for direct contacting of biomass slurries.

Reaction samples were analyzed for sugar, polyol, and organic acids using an HPLC method entailing a Bio-Rad Aminex HPX-87H column (300 mm×7.8 mm) operated at 0.6 ml/minute of a mobile phase of 5 mM sulfuric acid in water, at an oven temperature of 30° C., a run time of 70 minutes, and both RI and UV (320 nm) detectors.

Product formation (mono-oxygenates, diols, alkanes, acids) were monitored via a gas chromatographic (GC) method "DB5-ox", entailing a 60-m×0.32 mm ID DB-5 column of 1 um thickness, with 50:1 split ratio, 2 ml/min helium flow, and column oven at 40° C. for 8 minutes, followed by ramp to 285° C. at 10° C./min, and a hold time of 53.5 minutes. Injector temperature was set at 250° C., and detector temperature at 300° C.

Gasoline production potential by condensation reaction was assessed via injection of one microliter of liquid intermediate product into a catalytic pulse microreactor entailing a GC insert packed with 0.12 grams of ZSM-5 catalyst, held at 375° C., followed by Restek Rtx-1701 (60-m) and DB-5 (60-m) capillary GC columns in series (120-m total length, 0.32 mm ID, 0.25 um film thickness) for an Agilent/HP 6890 GC equipped with flame ionization detector. Helium flow was 2.0 ml/min (constant flow mode), with a 10:1 split ratio. Oven temperature was held at 35° C. for 10 minutes, followed by a ramp to 270° C. at 3° C./min, followed by a 1.67 minute hold time. Detector temperature was 300° C.

Example 1

Catalyst Poisoning by N,S Amino Acid

Two Parr5000 reactors were charged with 20 grams of a mixture of 50% glycerol in deionized water, and 0.35 grams of 1.9% Pt—Re/zirconia catalyst reduced at 400° C. under hydrogen. Glycerol is one of the intermediates derived from monosaccharides or sugar alcohols in the aqueous phase reforming reaction sequence, and can react via APR to form hydrogen and $CO_2$, as well as monooxygenate intermediates such as acetone and 2-propanol. It therefore represents a model component for the study of the APR reaction.

0.03 grams of the N,S amino acid cysteine were added to reactor B, but not to A. Reactors were pressured with 3500 kPa of $H_2$, and heated to 255° C. for 6.5 hours under conditions corresponding to aqueous phase reforming reaction (APR) with pre-addition of a fraction of the hydrogen required for reaction, before cooling for GC analysis of products. Results indicated 84.7% conversion of glycerol to mono oxygenate and other expected products for reactor A, but only 57.6% conversion for reactor B. Calculated first order rate constants, per weight fraction of catalyst, were 16.5/h/wt-cat for A, vs. 7.5/h/wt-cat for B. The addition of 1500 ppm cysteine was observed to decrease the apparent activity for conversion of glycerol via APR, by a factor of more then two.

A third reaction C was conducted under identical conditions, except with 1500 ppm alanine (N-only amino acid), and exhibited an apparent rate constant of 14/h/wt-cat, or an approximate 12% reduction in activity.

These results indicate substantial poisoning by cysteine (N,S-amino acid), and moderate poisoning by alanine (N-only amino acid), for the Re-promoted Pt catalyst which can be employed in aqueous phase reforming (APR).

Example 2

Poisoning of Pt/Alumina Catalyst by N,S and N-Only Amino Acid

The experiment of Example 1 was repeated with 5% Pt/alumina catalyst Escat 2941 (Strem Chemicals). In addition to reactors A (no amino acid) and B (1500 ppm cysteine), a third reactor C was charged with 1500 ppm of alanine, a N-only amino acid. Measured conversons were 56.7%, 42.3%, and 45.4% for reactors A through C, corresponding to apparent first order rate constants of 10.2, 3.0, and 3.2/h/wt-cat. Addition of 1500 ppm of either N,S or N-only amino acid was observed to decrease glycerol APR reaction rates by more than a factor of 3, for the unpromoted Pt/alumina catalyst.

Example 3

Poisoning of Ru Catalyst Under APR Conditions

Examples 1A and B were repeated with 5% Ru/C Escat 4401 catalyst (Strem Chemicals, 50% wet), with an initial charge of 6000 kPa $H_2$. Conversion for reactor A (no amino acid) was 56.5%, while conversion for reactor B (1500 ppm cysteine) was only 9%. Apparent first order rate constant for B (1500 ppm cysteine) was only 1.7/h/wt-cat, vs. a rate constant of reactor A of 14.7/h/wt-cat. This result indicates poisoning by amino acid of a Ru-based catalyst, in testing conducted under aqueous phase reforming (APR) conditions with pre-addition of a fraction of the required hydrogen needed for reaction.

Example 4

Poisoning of APR Catalyst Under N2 and H2

For examples 4A and 4B, the experiment of Example 1 was repeated with 5% Pt/alumina catalyst Escat 2941 (Strem Chemicals), but with 3000 kPa N2 instead of $H_2$ as the initial gas, such that all required hydrogen must be generated by the aqueous phase reforming reaction. Reactor A (no amino acid) exhibited an apparent first-order rate of 18.6/h/wt-cat, while B (1500 ppm cysteine) was severely poisoned with a rate of glycerol conversion of only 0.9/h/wt-catalyst. These results indicate substantial poisoning by cysteine (N,S-amino acid) for the unpromoted Pt catalyst employed in aqueous phase reforming (APR), conducted under conditions where all $H_2$ was generated in situ via the aqueous phase reforming reaction.

For examples 4C through 4E, the experiment of Example 1 was repeated with a Re-modified 1.9% Pt/zirconia catalyst calcined at 400° C. after impregnation, and then reduced at 400° C. under hydrogen. The reaction was conducted with an initial pressure of 5000 kPa H$_2$. Reactor C (no poison) indicated a first-order rate constant of 53.9/h/wt-cat, while Reactor D with 1500 ppm cysteine (N,S amino acid) gave lower conversions corresponding to a rate of only 4.8/h/wt-cat. Reactor E with 1500 ppm alanine (N-only amino acid) showed moderate activity, corresponding to a rate of 20.2/h/wt-catalyst. This experiment shows substantial poisoning by N,S amino acid cysteine, and moderate poisoning by N-only amino acid alanine, for aqueous phase reforming experiments conducted with glycerol as feed and with pre-addition of a fraction of the required hydrogen at the start of reaction.

Example 5

N,S- and N Poisoning of Pt/C Catalyst Used for Sorbitol APR

An experiment was conducted in the Parr5000 multireactor using 0.5 grams of 5% Pt/C as catalyst (50% wet), and 40 grams of 50% sorbitol as feed, for 3 hours at 250° C., with an initial gas feed of 3500 kPa H$_2$. Final liquids were analyzed for remaining unconverted sorbitol content by HPLC analysis. Conversion of reactor A (no amino acid) corresponded to an apparent first order rate constant of 28.8/h/wt-cat, while reactor B (3000 ppm cysteine) exhibited an apparent rate of only 2.8/h/wt-cat. Reactor C (2250 ppm alanine) exhibited an apparent first order rate constant for sorbitol conversion of 6.0/h/wt-cat. These results indicate poisoning of sorbitol aqueous phase reforming reaction by cysteine and alanine despite pre-addition of a fraction of the hydrogen required for reaction.

Example 6

Extraction of Biomass

For Example 6, Parr5000 reactors A-C were loaded with 2.1 grams of softwood (pine) chips, comprising 2 whole chips of approximte 1-inch×1-inch×3 mm size, trimmed to fit the reactor body, and 20 grams of a solvent mixture of 25% by weight acetone, 25% isopropanol, and 2% acetic acid in deionized water, designated as "A"-solvent. Reactors D-F were loaded with the same amount of pine chips, and deionized water only. The reactors were heated overnight under nitrogen, at temperatures of 170, 190, and 210° C. for reactors A, B, and C, respectively, and for reactors D, E. F, respectively (Table 1).

Partially digested whole chips were carefully removed to Petri dish for vacuum drying overnight at 90° C. to assess undigested dry solids. Fine solids were washed into a filter funnel with Whatman GF/F filter paper, which was also vacuum dried overnight at 90° C. to assess the residual fines solids which precipitated after cooling of the reactors to ambient temperature. Mass loss from the whole chips was recorded as percent digested at the extraction temperature. This amount was corrected by the mass of fines redeposited upon cool down to 25° C., and recorded as the "% dissolved at 25 C".

Samples of liquid were analyzed for nitrogen by elemental X-ray analysis.

TABLE 1

Extraction and Pre-treatment by solvent leaching

| Sx | solvent | T deg C. | Liquid/ dry wd | Chips % digest | Dissolved % @25° C. | N leached ppm-dry wood |
|---|---|---|---|---|---|---|
| A | A-solv | 170 | 11.896 | 38.4% | 34.1% | 416 |
| B | A-solv | 190 | 11.925 | 52.4% | 45.9% | 405 |
| C | A-solv | 210 | 12.138 | 100.0% | 66.5% | 449 |
| D | DIWater | 170 | 11.930 | 29.0% | 24.2% | 143 |
| E | DIWater | 190 | 12.756 | 33.7% | 27.5% | 268 |
| F | DIWater | 210 | 11.106 | 61.6% | 45.7% | n.a. |

As shown in Table 1 extraction and dissolution of biomass was enhanced by the use of water-soluble oxygenated organic solvent in deionized water over deionized water. The extent of extraction and digestion was also increased by an increase in temperature, with complete digestion of wood chips at 210° C. in A-solvent. Solvent also increased the extraction of nitrogen, presumed from proteins and amino acids in the wood matrix, where nitrogen observed in the liquid extract is expressed relative to the mass of dry wood extracted. Sulfur analyses were low, at detection limits for these samples.

This example demonstrates the use of oxygenated solvent, selected from components produced in situ via APR of bio-based feed materials in water, to facilitate extraction and solubilization of a portion of a biomass sample, including N-containing components attributed to the presence of amino acids and proteins. The extract can be used to produce biofuels by aqueous phase reforming, with optimal removal of the N-containing species to protect catalyst life. Use of oxygenated organic solvent enabled more extensive extraction to occur at lower temperature, where heavy ends formation may be minimized. A residual pretreated solid pulp is also produced, which may be used for other applications.

Example 7

Biomass Extraction and Reprecipitation in Water and Oxygenated Solvents

A series of experiments were conducted in a 100-ml Parr reactor fitted with 0.5 micron stainless steel filtered dip tube. Extraction of southern hardwood was examined, with removal of samples via filtered via dip tube at 210° C. temperature (17 hours), to compare the % precipitated solids in the sample after cooling to ambient temperature (nominal 25° C.), with the % solids in the final mixture recovered from the reactor as determined via cold filtration. The fraction of biomass extracted and digested was also assessed, by GC analysis of the intermediates formed. In addition to testing of "A-solvent" and deionized water, 50% ethanol in water, and "B-solvent" entailing 20 wt % ethylene glycol, 20% wt % 1,2-propylene glycol, and 2% acetic acid in deionized water, were also examined. "B-solvent" represents diol intermediates formed in the APR reaction. Assessment of the percent digestion of initial dry wood was again made by recovering the undigested solids by filtration on Whatman GF/F filter paper, and drying overnight in a vacuum oven at 90° C.

Results (Table 2) show all solvents can digest a portion of the wood sample at 210° C. A-solvent (25% acetone, 25% isopropanol, and 2% acetic acid) gave the best digestion, or dissolution of biomass. Addition of oxygenate solvent including those components formed in an APR reaction of bio-based feeds, was observed to improve the retention of dissolved biomass components in solution upon cooling to ambient temperature. Presence of lignin in precipitating samples was confirmed by UV-vis analysis in the region of 190-400 nm. While water-only solvent gave good extraction results at the 210° C. extraction temperature, a substantial portion precipitated upon cooling to 25° C.

TABLE 2

Solvent extraction and re-precipitation of biomass as assessed by hot (210° C.) vs ambient (25° C.) filtration

|   | Solvent | initial wood | 25° C. % digest | 210° C. % digest |
|---|---------|--------------|-----------------|------------------|
| A | A Solvent | 5.43% | 72.19% | 73.84% |
| B | B solvent | 5.80% | 41.57% | 28.92% |
| C | 50% EtOH | 5.42% | 54.24% | 42.32% |
| D | DI water | 5.32% | 29.10% | 69.33% |

Example 8

Removal of N,S Amino Acid Cysteine by Ion Exchange

A solution of 0.5 wt % N,S amino acid cysteine in deionized water was prepared, with and without addition of 0.5 wt % acetic acid. 7 grams of solution were contacted with between 0.02 and 0.26 grams of ion exchange resins Amberlyst A-21 dimethyamino weak base resin, and Amberlyst A-15 strong sulfonic acid resin (Rohm and Haas). Resins were shaken overnight at 25° C., and sampled for x-ray analysis of remaining nitrogen. The amount of N exchanged on the resin was calculated from the loss of nitrogen from the liquid, and the known ratio of resin to liquid charged. Results (Table 3) show strong adsorption or exchange of cysteine amino acid by both resins, as evidenced by a separation factor "SF" calculated as the ratio of N adsorbed on the resin, to N remaining in solution. Observation of a separation factor SF which increases as the amount of N remaining in solution decreases, indicates strong sorption and ion exchange, such that a fixed-bed ion exchange contactor can be designed to effect complete removal of N.

The amino acid cysteine was the only source of N for these experiments, and contains a sulfur (S) atom for every nitrogen (N) atom present. Measurement of removal of nitrogen N thus also indicates removal of an equivalent fraction of sulfur S, for these experiments. The experiments show the ability of acidic or basic ion exchange resins to remove amino acids from aqueous solution under appropriate conditions.

TABLE 3

Removal of cysteine by ion exchange

| Resin | acetic acid | Final Liquid ppm-N | Final Resin-ppm N | SF |
|-------|-------------|--------------------|-------------------|-----|
| A-21 weak base | 0.50% | 163 | 51471 | 316 |
| A-21 weak base | 0.50% | 88 | 41176 | 468 |
| A-21 weak base | 0.50% | 37 | 27861 | 753 |
| A-21 weak base | 0.50% | 11 | 12666 | 1151 |
| A-15 strong acid | 0% | 152 | 44825 | 295 |
| A-15 strong acid | 0% | 86 | 38611 | 449 |
| A-15 strong acid | 0% | 33 | 26047 | 789 |
| A-15 strong acid | 0% | 9 | 11776 | 1308 |

Example 9

Mixed Bed Removal of N, S Amino Acid

A sample of Brazilian cane juice concentrate containing dissolved proteins and amino acids was diluted 50% with deionized water, and the resulting 50% cane juice mixture was mixed with varying fractions of deionized water to prepare a series of dilutions, before contacting 10-g of total liquid with a nominal 0.5 grams of Amberlite MB-20 mixed bed strong acid and base ion exchange resin. The liquid and resin mixture was equilibrated by shaking overnight at 25° C., followed by sampling for x-ray analysis of residual nitrogen and sulfur. A separation factor SF was again calculated, as the ppm of N or S sorbed in the resin, divided by the ppm of N or S remaining in the liquid solution. Separation factors which increased as the final solution concentration of N and S decreased were again observed, indicating strong sorption and ion exchange (Table 4). This result indicates a mixed bed ion exchange resin such as MB-20 can be effective in removal of N,S compounds present in an aqueous solution of a natural sugar-based feedstock.

TABLE 4

Removal of N, S impurities in cane juice by mixed bed ion exchange

| Sx | Resin-g | 50% cane-g | DIW-g | final N (ppm-L) | final S (ppm-L) | SF-N | SF-S |
|----|---------|------------|-------|-----------------|-----------------|------|------|
| feed | 0.00 | 10.00 | 0.00 | 374.0 | 388.5 | N/A | N/A |
| A | 0.54 | 10.33 | 0.00 | 273.0 | 110.0 | 8.3 | 52.9 |
| B | 0.55 | 5.06 | 5.03 | 103.0 | 16.0 | 16.7 | 225.5 |
| C | 0.56 | 1.02 | 9.01 | 2.0 | 1.0 | 360.7 | 771.0 |
| D | 0.53 | 0.30 | 9.70 | 0.1 | 0.1 | 2234.5 | 2321.9 |

Example 10

Ion Exchange Treatment of Solvent and Water Extract

"A-solvent" (190° C.) and deionized (DI) water (170° C.) extraction liquids from the extraction of soft (pine) wood in Example 6, were contacted by shaking overnight at 25° C., with Amberlite MB-20 monobed resin at a liquid/dry resin ratio of 21-24 X-ray analysis of final liquid indicated removal of a substantial portion of the N impurities leached from the softwood sample, in a single contacting (Table 5). This result demonstrates the use of a mixed or monobed of strong acid and base resin (MB-20) to remove the specific N compounds found in extracts from soft wood samples, in the presence of water or aqueous oxygenated solvents. Sulfur S was below detection limit in these samples.

TABLE 5

Purification of softwood (pine) extracts by mixed bed ion exchange

| # | Liquid | Liq/dry-resin | feed liquid N-ppm | Final liquid N-ppm | Resin N-ppm |
|---|--------|---------------|-------------------|--------------------|-------------|
| B | A-solv extract 190° C. | 21 | 34 | 11 | 486 |
| D | DI water extract 170° C. | 24 | 12 | 3 | 218 |

Example 11

Short Contact Time Extraction with Oxygenated Solvent and Water

For Example 11A 42.25-grams of an A-solvent mixture (25% acetone, 25% isopropanol, 2% acetic acid in water) were contacted with 4.308 grams of southern hardwood for 5 hours at 170° C., followed by cooling to room temperature for recovery of undigested solids by filtration (Whatman GF/F). Separated liquor was black, indicating removal of color bodies. The recovered solid pulp was water washed to remove residual solvent. A portion was dried overnight in a vacuum oven at 90° C., to assess dry solids content of the recovered pulp. Results indicate extraction of 47.5% of the original softwood, on a dry mass basis, using a contact time of 5 hours. X-ray analysis indicated removal of 860 ppm nitrogen basis the mass of dry wood charged, using the extractive solvent pretreatment. Sulfur was below detection in this sample.

In example 11B, extraction was examined with series of consecutive experiments conducted with 22.4 grams of softwood (pine) and 500-grams deionized water in the 1-Liter stirred reactor with filtered dip tube, and sampling for total organic carbon analysis versus time. The leaching studies conducted overnight at 170, 190, and 210° C. A maximum in the TOC content was obtained after only 2 hours at 170° C., where 73% of the final leached carbon was obtained. Further increase to 210° C. before removal of liquid by hot filtration, resulted in 65% digestion of the initially charged biomass, as determined by filtration (Whatman GF/F) of solids remaining in the reactor after cooling.

These results indicate an ability to pretreat and extract biomass samples with water or oxygenated organic solvents, with a contact time as low as 2-5 hours. Up to 65% of the nitrogen present in the biomass was also extracted in a single stage of extraction, such that removal of nitrogen and sulfur compounds, if present, is required to protect catalysts sensitive to these components, and used for further processing of the extract.

Example 12

APR of Ion Exchange-Treated Solvent Extract 4.308 grams of southern hardwood were charged to a Parr5000 reactor with 42.25 grams of "A-solvent" (25% isopropanol, 25% acetone, and 2% by weight acetic acid in deionized water) and 6400 kPa of $N_2$, before heating for 5 hours at 170 C. Aqueous liquor extract was separated from undigested pulp via filtration with Whatman GF/F paper in a filter funnel. The extract liquid was contacted with Amberlite MB-20 monobed resin at 20:1 liquid/resin ratio overnight, followed by separation of resin by filtration.

The ion exchange-treated liquid extract was diluted 1:1 with deionized water. 19.75 grams were charged to a Parr5000 reactor, along with 0.45 grams of 5% Pt/alumina Escat 2941 catalyst (Strem Chemicals), and 4800 kPa of $N_2$. The reactor was heated to 170° C., then ramped to 240° C. over 5 hours, then left to react at 240° C. overnight, to complete an 18-hour cycle. GC analysis using the DB5-ox method indicated 46% yield of the expected monooxygenates and intermediates, relative to the dry mass of wood extracted, not including formation of additional isopropanol solvent. This compares to a maximum yield of approximately 70% corresponding to the fraction of hydrolyzable carbohydrates in the original sample. Refinery gas analysis indicated a 9.2% net yield of feedstock carbon to $CO_2$, and a 9.6% net yield of hydrogen which was not incorporated into reaction products.

This result demonstrates an ability to convert ion-exchanged aqueous liquor from extraction of biomass, into additional mono-oxygenate intermediates which can be condensed, or dehydrated and oligomerized to liquid fuels, using aqueous phase reforming reactions, where the hydrogen formation needed for conversion was generated in situ, and not requiring the addition of external hydrogen.

Example 13

APR Reaction for Di-Water Extract of Hardwood 19.9 grams of aqueous liquor extract from deionized (DI)-water extraction of southern hardwood at 170° C., were added with 0.501 grams of 5% Pt/alumina Escat 2941 catalyst (Strem Chemicals), and 5800 kPa of $N_2$ to a Parr5000 reactor. The reactor was heated overnight (18 hours) at 240° C., before sampling for injection of final liquid onto the ZSM-5 pulse microreactor. Results indicated 37% conversion to alkanes, benzene, toluene, xylenes, trimethylbenzenes, and naphthalenes, relative to that which would be obtained for a model aqueous phase reforming reaction from conversion of the carbon contained in the extracted liquid, to isopropanol, with co-generation of hydrogen and $CO_2$. A pressure rise was observed during the course of reaction, indicative of hydrogen formation.

This result demonstrates an ability to extract biomass with deionized water, treat the aqueous liquor extract with ion exchange resin to effect removal of nitrogen and sulfur present at least in part as amino acids or proteins, conduct an aqueous phase reforming reaction on the ion exchange treated aqueous liquor extract to form monooxygenate intermediates, and to then condense the monooxygenate intermediates to gasoline-range products over an acid catalyst, per the sequence comprising one embodiment of this invention.

Example 14

Mono-Oxygenates Synthesis Via APR of Corn Stover Extract 2.037 grams of corn stover (15.2% moisture) were extracted with A-solvent for 18 hours with a temperature ramp from 170 to 210° C., resulting in solubilization of 66.3% of the stover charged, on a dry mass basis. The resulting liquor extract was added together with 0.35 grams of a Re-promoted Pt/zirconia catalyst, and 3500 kPa of $H_2$, before heating to 240° C. overnight to effect APR reaction with pre-addition of a portion of the hydrogen needed for reaction. GC analysis of final product using the DB5-ox method revealed a conversion of 66.2% of the extracted biomass into monooxygenates and diols intermediates. This result demonstrates an ability to extract corn stover with a monooxygenate solvent containing aqueous medium comprising components which are formed in situ during APR reaction, and to react the extract with APR catalyst to generate additional mono-oxygenates and diol intermediates, via use of the APR reaction with pre-addition of hydrogen. The monooxygenates formed may be routed to a further processing step such as acid condensation, or dehydration and alkylation or oligomerization, to make liquid fuels.

What is claimed is:
1. A method comprising:
(i) providing a biomass comprising celluloses, hemicelluloses and lignin;
(ii) contacting said biomass from step (i) with an aqueous media to form an extracted biomass comprising celluloses, hemicelluloses, soluble carbohydrates and lignin;
(iii) separating said extracted biomass from step (ii) into at least an aqueous liquor stream comprising soluble carbohydrates and an extracted biomass solids stream comprising celluloses, hemicelluloses, and lignin, thereby providing said aqueous liquor stream separate from said extracted biomass solids stream and external of a vessel containing said extracted biomass of step (ii);

(iv) contacting said aqueous liquor stream of step (iii) with a purification substrate effective to remove sulfur compounds and nitrogen compounds, thereby producing a treated carbohydrate stream having less than 35 wt % of the sulfur content and less than 35 wt % of the nitrogen content of a corresponding untreated aqueous liquor stream;

(v) contacting said treated carbohydrate stream of step (iv) with an aqueous phase reforming catalyst to form a plurality of oxygenated intermediates; and (vii) processing at least a portion of said oxygenated intermediates of step (v) to form a liquid fuel.

2. The method of claim 1, wherein a first portion of said oxygenated intermediates of step (v) are recycled to form in part the aqueous media of step (ii) and processing at least a second portion of said oxygenated intermediates of step (v) to form a liquid fuel.

3. The method of claim 1, wherein said purification substrate of step (iv) is selected from the group consisting of activated carbons, aluminas, silicas, silica-aluminas, clay minerals, diatomatious earth, zirconia, titania, polymeric adsorbents, ion-exchange resins, and any combinations thereof.

4. The method of claim 1, wherein said purification substrate of step (iv) is an ion exchange resin.

5. The method of claim 1, wherein said extracted biomass solids stream of step (iii) is further subjected to digestion.

6. The method of claim 5, wherein said digestion is under conditions effective to produce pulp for producing paper.

7. The method of claim 5, wherein said digestion is under conditions effective to produce digested biomass for subsequent enzyme hydrolysis and fermentation to produce alcohol.

8. The method of claim 1, wherein said oxygenated intermediates of step (v) are subjected to a condensation reaction to produce a liquid fuel.

9. The method of claim 2, wherein said at least second portion of said oxygenated intermediates of step (v) are subjected to a condensation reaction to produce a liquid fuel.

10. The method of claim 1, wherein said oxygenated intermediates of step (v) are subjected to a dehydration reaction and an alkylation reaction to produce a liquid fuel.

11. The method of claim 2, wherein said at least second portion of said oxygenated intermediates of step (v) are subjected to a dehydration reaction and an alkylation reaction to produce a liquid fuel.

12. The method of claim 1, wherein said treated carbohydrate stream of step (iv) has a sulfur content of less than 10 wt % and a nitrogen content of less than 10 wt % of said corresponding untreated aqueous liquor stream.

13. The method of claim 1, wherein said aqueous media of step (ii) comprises water and a water soluble organic solvent.

* * * * *